United States Patent
Seiler

(10) Patent No.: US 12,505,122 B2
(45) Date of Patent: Dec. 23, 2025

(54) METHOD FOR DOCUMENTING A TYPE CONFIGURATION FOR A COMPUTING DEVICE, COMPUTER PROGRAM AND DATA CARRIER

(71) Applicant: MERCEDES-BENZ GROUP AG, Stuttgart (DE)

(72) Inventor: Christian Seiler, Fellbach-Schmiden (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/844,553

(22) PCT Filed: Feb. 20, 2023

(86) PCT No.: PCT/EP2023/054125
§ 371 (c)(1),
(2) Date: Sep. 6, 2024

(87) PCT Pub. No.: WO2023/169808
PCT Pub. Date: Sep. 14, 2023

(65) Prior Publication Data
US 2025/0209088 A1    Jun. 26, 2025

(30) Foreign Application Priority Data

Mar. 9, 2022    (DE) .................. 10 2022 000 817.3

(51) Int. Cl.
*G06F 16/20*    (2019.01)
*G06F 8/71*    (2018.01)
*G06F 16/27*    (2019.01)

(52) U.S. Cl.
CPC .............. *G06F 16/27* (2019.01); *G06F 8/71* (2013.01)

(58) Field of Classification Search
None
See application file for complete search history.

(56) References Cited

U.S. PATENT DOCUMENTS

| | | | |
|---|---|---|---|
| 10,579,368 B2 | 3/2020 | Wisnovsky | |
| 2018/0059913 A1* | 3/2018 | Penilla | G06F 3/04842 |

(Continued)

FOREIGN PATENT DOCUMENTS

| | | |
|---|---|---|
| DE | 102010050379 A1 | 6/2011 |
| JP | 2019220146 A | 12/2019 |

OTHER PUBLICATIONS

Anonymous: "Distributed database—Wikipedia", Nov. 15, 2021, Seiten 1-2, XP093287909, Found on the Internet: URL:https://en.wikipeclia.org/w/index.php? title=Distributed database&oldid = 1055343850.

(Continued)

*Primary Examiner* — Jau Shya Meng
(74) *Attorney, Agent, or Firm* — PATENT PORTFOLIO BUILDERS PLLC

(57) ABSTRACT

The invention relates to a method for documenting A type configuration generated using a provided type library for at least one computing device is documented by providing a first version of the type library by a first computing device and storing an identification value of the first version of the type library in a distributed database. A first at least partial type configuration and/or complete type configuration is generated using the first version the type library by the first computing device and/or at least one further computing device and an identification value of the first type configuration is stored in the distributed database.

7 Claims, 1 Drawing Sheet

(56) References Cited

U.S. PATENT DOCUMENTS

Figure 1:
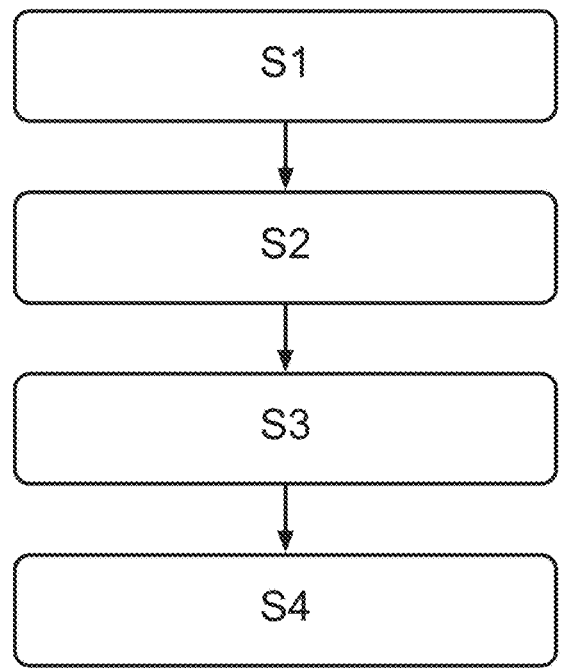

| | | |
|---|---|---|
| 2019/0305959 A1 | 10/2019 | Reddy et al. |
| 2019/0384594 A1 | 12/2019 | Michiyama et al. |
| 2021/0120387 A1* | 4/2021 | Roy .................. H04W 4/50 |
| 2021/0311926 A1 | 10/2021 | Ponceleon et al. |

OTHER PUBLICATIONS

Office Action dated Jul. 9, 2025 in related/corresponding EP Application No. 23 706 722.8.

International Search Report and Written Opinion mailed May 12, 2023 in related/corresponding International Application No. PCT/EP2023/054125.

Office Action dated Aug. 20, 2024 in related/corresponding EP Application No. 23 706 722.8.

Wikipedia; "Version control;" Mar. 2, 2022; https://en.wikipedia.org/w/index.php?title=Version_control&oldid=1074900267.

Office Action dated Aug. 26, 2025 in related/corresponding JP Application No. 2024-552131.

\* cited by examiner

METHOD FOR DOCUMENTING A TYPE CONFIGURATION FOR A COMPUTING DEVICE, COMPUTER PROGRAM AND DATA CARRIER

BACKGROUND AND SUMMARY OF THE INVENTION

Exemplary embodiments of the invention relate to a method for documenting a type configuration, generated using a provided type library, for a computing device, in particular of a motor vehicle, to a computer program, and to an electronically readable data carrier.

Future regulations could require car manufacturers to support what is known as a software update management system (SUMS) in order to be able to roll out software updates for motor vehicles over-the-air and thus directly at the end user, for example without the motor vehicle having to go to a repair shop. In addition, the aim is to make software updates easier to schedule and, in particular, more transparent. Forgery-proof documentation of planning results poses a challenge in particular. The documentation should also be traceable for many years to come.

DE 10 2010 050 379 A1 discloses a product line-based content management system and a corresponding method.

The problem addressed by the present invention is that of providing a method, a computer program, and a data carrier, which can be used to ensure the security or integrity of software updates, in particular in motor vehicles, in a particularly advantageous manner.

A first aspect of the invention relates to a method to document a type configuration, generated using a provided type library, for at least one computing device, which is a first computing device and/or at least one further computing device. By way of example, the first computing device is a computing device of a network of computing devices for product line development. The at least one further computing device is, in particular, a computing device of a motor vehicle. In this case, the respective computing device is, in particular, an electronic computing device and comprises, in particular, a processor. The respective computing device is thus advantageously a computer and/or designed for electronic data processing.

The type library is, for example, an interface description for access to an, in particular, publicly accessible data structure and/or subroutines for a third-party utility program. In this case, the utility program can be a server, for example, which could be jointly used by the subroutines. Using the type library, a partial and/or complete type configuration can be created, which, for example, provides the basis for a distributed development ecosystem.

The documenting method according to the invention comprises several steps:

In a first step, a first version of the type library is provided by a first computing device.

In a second step of the method, an identification value of the first version of the type library is stored in a distributed database.

In a third step, a first at least partial and/or in particular complete type configuration is generated using the first version of the type library by the first computing device and/or a further computing device, for example the computing device of the motor vehicle.

In a fourth step, an identification value of the first type configuration is stored in the distributed database.

The distributed database is, in particular, a distributed ledger, similar to a distributed cash book, which is advantageously suited to the documentation of the type library and/or the type configuration. Such a distributed ledger comprises, for example, a type of consensus method, so that any manipulation of the identification values, which can each be uniquely assigned to the type configuration or the type library, can be ruled out or made particularly difficult. For instance, the identification value of the first version of the type library is a value such as a hash value, for example, by which the first version of the type library can be uniquely identified and in particular changes to the type library, which would lead in particular to a new version, can be recognized. Changes to the type library would thus lead to a different identification value. The respective identification value of the respective version of the type configuration has an analogous design.

The first computing device can be, for example, a computing device of a type library authoring system. The further computing device can be, for example, a control device of a motor vehicle.

Thus, one advantage of the invention is, for example, a specific, automated and irreversible creation and/or updating of the specific, first type library and the partial and/or complete type configurations derived therefrom. By using the distributed database designed, in particular as a distributed ledger, tamper-proof documentation is made possible on the one hand and the basis for distributed development ecosystems is laid on the other hand. In the process, data protection and the protection of intellectual property can be taken into account in a particularly advantageous manner. For instance, the method according to the invention is also suitable, for example, for managing type configurations, as a method for establishing a type configuration, as a method for testing an integrity of a type library, as a method for creating a consistent type configuration, which can be used for example for over-the-air updates, and as a method for certifying a type configuration.

The invention is based on the understanding that distributed ledger technologies could be suitable for documenting distributed development ecosystems in particular. The type configuration can give a specific characteristic of a previously generic development result, for example when developing the type library. In the process, it should be possible to include a plurality of configuration and ordering options for the motor vehicle end user, which have to be covered in the development process and taken into account in the production/manufacturing process.

For instance, it is known that type libraries can be built that a take a plurality of configuration and ordering options into account. It is also known how a partial type configuration and lastly also how complete or full type configurations can be derived from the type library.

Due to the method according to the invention, the requirements for the type library and/or the type configuration can be met and operationalized in a distributed development ecosystem.

In other words, the method according to the invention offers the option, in particular based on the distributed database, of using an, in particular, central type library to be able to create, in particular, consistent, partial, and/or complete type configurations, which in turn can form a basis for a distributed development ecosystem. Advantageously, for example only references that can be represented, in particular, by the identification values and refer in each case to the type library or to the type configuration can be stored in the distributed database, for example as a hash (value) or in addition to the hash value. The actual source data and thus, for example, the source code of the type library and/or the type configuration can be stored in a separate database, for example.

In an advantageous embodiment of the invention, the distributed database is operated by a consensus method. In other words, the database is in the form of a distributed ledger and in particular a blockchain. The consensus method can, for example, be a proof work, which can be provided by solving cryptographic puzzles. Additionally, or alternatively, for example, a proof of stake can be provided, as a result of which the computing devices involved in the distributed database, such as the first computing device and the at least one further computing device, each have the option of providing the proof of stake and/or the proof of work and thus agreeing on a unique, generally valid version of the respective identification value. Alternatively, for example, a so-called proof of time and/or a proof of space can be provided. Using a consensus method advantageously ensures that the documentation is forgery-proof.

In another advantageous embodiment of the invention, the respective type library and/or the respective type configuration are each stored in at least one further database. In other words, for example, memory space is kept available by at least one of the computing devices, in which, in particular in a database structure, for example the source code of the type library and/or the type configuration is stored. It is thereby possible for the distributed database in which the identification values are stored, to remain as streamlined as possible, for example, as a result of which the method can be carried out particularly efficiently for example. Additionally, or alternatively, storage costs can be saved as a result, for example.

In another advantageous embodiment of the invention, at least one of the databases and/or at least one of the computing devices are synchronized via the distributed database, wherein, in particular, at least one of the computing devices is part of a product line development (software product line (SPL) engineering). In other words, a file exchange takes place between the individual computing devices and/or databases, whereby the distributed database regulates a data synchronization so that the databases or computing devices are in each case in particular collectively up to date and thus can access a respective current version of the type library or a type configuration. For instance, databases of software product line (SPL) engineering can advantageously be synchronized by means of distributed ledgers or blockchain in order to achieve the transparency and traceability required for certification and/or to improve decentralized software development. Furthermore, there is the advantage that software built on the type library and/or the type configuration can be kept up to date in every computing instance or computing device and thus, for example, in the motor vehicle.

In another advantageous embodiment of the invention, additional method steps are carried out. For instance, in a further step, a second version of the type library, which is derived from the first version, is provided by the first computing device and/or a further computing device. In a subsequent step, an identification value of the second version of the type library is stored in the distributed database. In other words, a new version of the type library is provided which is or will be developed building on the first type library, for example the source code thereof. The identification value that uniquely identifies the second version of the type library is now likewise stored in the distributed database. If the distributed database is a blockchain, for example, another block with the associated dentification value is added to the database. This results in the advantage that the method can document changes to the type library in a particularly advantageous manner.

In another advantageous embodiment, additional steps are carried out: generating at least one second at least partial and/or complete type configuration using the second version of the type library by the first computing device and/or a further computing device. Furthermore, an identification value of the second type configuration is stored in the distributed database.

By way of example, continually developing the content of the type library means that this should be updated and revised regularly, for example daily. The method offers the advantage that a corresponding release process can preferably be designed such that existing content of the type library is not deleted, but rather only new content is added.

In a distributing development economy or to update software in motor vehicles, where new components are to be added, a deletion process of a type library should only be permissible if no elements derived therefrom of the partial and/or complete type configuration and thus no specific product instances, for example of the motor vehicle, are accessed by the end user. This can now at least be reproduced with the additional steps.

Similar to deleting a type library, elements of the partial and/or the complete type configuration can or should only be deleted if no specific product instances, for example motor vehicles, are affected. As soon as a complete type configuration is used by a specific product instance, all elements of the product line development to which the complete type configuration refers are relevant to documentation and thus silicification if these are to be future software updates for a motor vehicle. Advantageously, any changes to the type configuration can be documented in a particularly advantageously manner and thus in particular permanently by means of the method.

This can be made possible, in particular, through the use of the identification values. Therefore, in one advantageous embodiment of the invention, the respective identification value is a reference value and/or a cryptographic hash value and/or the respective sub-library or the respective type configuration are stored at least as part of the respective identification value. In other words, the respective identification value comprises a reference value and/or a hash value and/or the type library or the type configuration. This results in the advantage, for example, that in the event of a deletion process for example of a source file, a corresponding reference remains in the distributed ledger, even if this is blank. This is, in particular, uncritical if, as previously described, the deleted element, which can be, for example, a part of a type configuration, in no way depends on the specific product instance in the case of an end user. This offers the advantage that the method can be used particularly advantageously for documenting.

In another advantageous embodiment of the invention, at least one of the computing devices provides a runtime environment, by means of which the respective type library and/or type configuration can be executed. In other words, at least one of the computing devices, which has access to the distributed database and for example is part of the motor vehicle, is designed so that software based on one of the type configurations, for example a product line, can be used directly if the method is employed in product line development. This offers the advantage that software can not only be distributed quickly but can also be executed quickly.

A second aspect of the invention relates to a computer program, which can be loaded directly in a memory of a computing device, having program means for executing the steps of the method according to the first aspect of the invention if the program is executed in the computing device.

In this case, advantages and advantageous embodiments of the first aspect of the invention are to be regarded as advantages and advantageous embodiments of the second aspect of the invention and vice versa.

A third aspect of the invention relates to an electronically readable data carrier having electronically readable control information stored thereon, which comprises at least one computer program according to the second aspect of the invention and is configured in such a way it executes a method according to the first aspect of the invention when the data carrier and a computing device are used.

In this case, advantages and advantageous embodiments of the first and second aspect of the invention are to be regarded as advantages and advantageous embodiments of the third aspect of the invention and vice versa.

Further advantages, features and details of the invention become apparent from the following description of a preferred exemplary embodiment and with reference to the drawing. The features and feature combinations mentioned above in the description and the features and feature combinations mentioned hereinafter in the description of the figures and/or shown on their own in the figures can be used not only in the respectively specified combination, but also in other combinations or in isolation, without departing from the scope of the invention.

BRIEF DESCRIPTION OF THE DRAWING FIGURES

Figure 2:
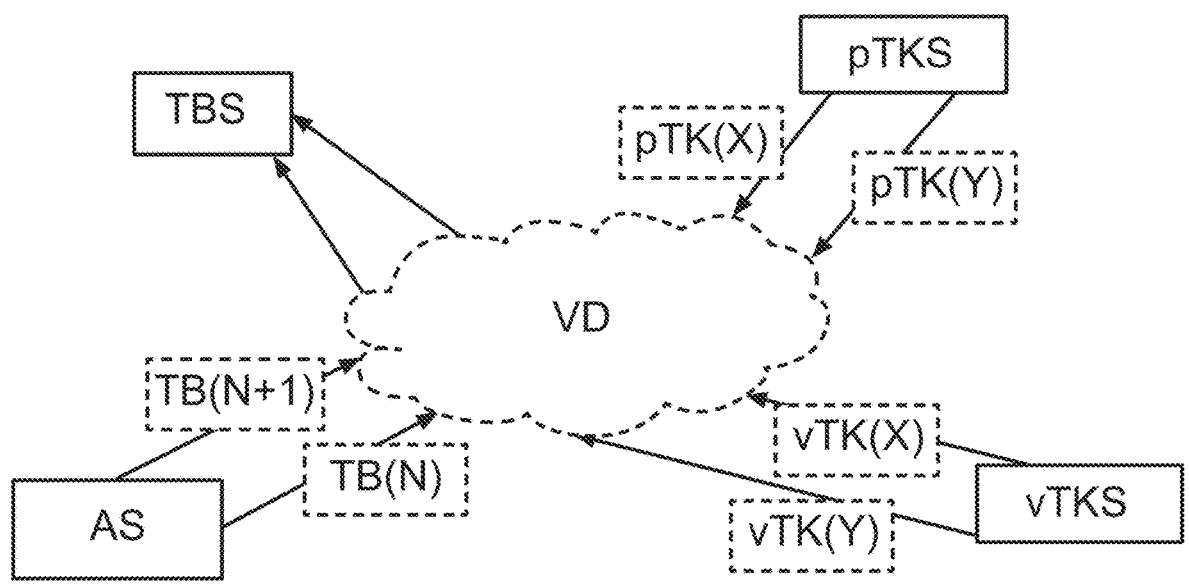

In the drawing:

FIG. 1 shows a schematic process diagram of a method for documenting a type configuration; and FIG. 2 shows, in a schematic diagram, an exemplary embodiment of the method according to FIG. 1.

DETAILED DESCRIPTION

FIG. 1 shows a schematic process diagram of a method for documenting a type configuration, generated using a provided type library, for a computing device in particular of a motor vehicle.

Advantageously, for example, it will be possible in future to supply electronic computing devices in the form of control devices in motor vehicles with documentable and moreover certifiable software updates, which are therefore as difficult as possible to falsify.

This can be made possible by the method presented, which, in addition to the documenting, also makes it possible to manage the type configuration, meaning that the method can define a type configuration. Moreover, the method is also suitable for checking the integrity or forgery protection of the type library.

To that end, the method has several steps:

In a first step S1 of the method, a first version N of the type library TB(N) is provided by a first computing device, which is designed, for example, as an authoring system AS.

In a second step S2, an identification value of the first version N of the type library TB(N) is stored in a distributed database VD.

In a third step S3, a first at least partial type configuration pTK(X) or a complete type configuration vTK(X) is generated by the first computing device, the authoring system AS, and/or at least one further computing device. This at least one further computing device is, for example, a partial type configuration service pTKS and a complete type configuration service vTKS.

Lastly, in a fourth step S4, an identification value of the first type configuration pTK(X) or vTK(X) is stored in the distributed database VD.

FIG. 2 shows, in a schematic diagram, an exemplary embodiment of the method presented in FIG. 1, in which the authoring system AS releases a new version N of the type library TB(N) in a step. This is documented on the distributed database VD according to step S2.

Now, for example, a partial type configuration pTK(X) is created by a further computing device, such as a partial type configuration service pTKS, on the basis of the type library version N and the identification value thereof is documented in the database VD, according to step S3. In addition, or alternatively, a complete type configuration vTK(X) is created by the complete type configuration service vTKS, according to step S3. The associated identification values are now stored in step S4.

This ensures complete documentation, including traceability back to the respective version of the type library.

By way of example, in a second phase of the process illustrated in FIG. 2, the content of the sub-library TB (N) is developed and released in a new version N+1 as sub-library TB(N+1), whereby a type library service uses the new version N1 of the type library TB N+1 from this point onwards, for example reads it. In other words, a second version N+1 of the type library TB, which is derived from the first version N, is provided by the first computing device (AS) and/or a further computing device (pTKS). In addition, an identification value of the second version N+1 of the type library TB is thereby stored in the distributed database VD.

In a further, subsequent step, for example the computing device, which is designed as a partial type configuration service pTKS, can create a new partial type configuration pTK(Y) based on the type library TB(N+1) and the identification value thereof can be documented in the distributed database VD.

If, additionally or alternatively, a complete type configuration vTK(Y) is created on the basis of the type library TB(N+1), this is also documented in the distributed database VD.

In addition to versioning the entire type library TB (N)/TB(N+1), the method can also be used to uniquely reference and version individual components of the respective type library TB(N)/TB(N+1) itself.

Advantageously, in the method, a runtime environment is provided by at least one of the computing devices, for example AS and/or TKS and in particular by the type library service TBS, by means of which respective type libraries TB(N), TB(N+1) or the respective type configuration TK(X), TK(Y) can be executed. For example, the type library service TBS can provide the runtime environment so that version N and/or N+1 of the type libraries TB can be accessed, or can at least be read.

The respective type configurations vTK(X), vTK(Y), pTK(X), pTK(Y) thus always refer exactly to a unique version N or N+1 of the type library TB(N)/TB(N+1) from which they are derived. In the case of the complete type configuration vTK(X), vTK(Y), they can also refer to a unique version of the partial type configuration pTK(X), pTK(Y).

By means of the method presented here, it is therefore possible to secure all the information made available, which comprises the type libraries TB(N), TB(N+1) and the type configuration vTK(X), vTK(Y), pTK(X), pTK(Y), via the central database VD, which, in particular, has a consensus mechanism and is moreover designed as a distributed ledger or blockchain, so that subsequent manipulation of this information is not possible.

The respective identification value that is stored on the distributed database VD has, for example, a reference and/or a cryptographic hash value and/or the respective type library TB(N), TB(N+1) or the respective type configuration vTK(X), VTK(Y), pTK(X), pTK(Y) itself. In addition, or alternatively, the respective type library TB(N), TB(N+1) and/or the respective type configuration vTK(X), vTK(Y), pTK(X), pTK(Y) can each be stored in at least one further database.

To map corresponding development ecosystems, such as development projects in the context of collaborations or to restrict cooperation with certain suppliers, the method can lay corresponding layers on respective subregions of the type library, the partial and/or also the complete type configurations. These layers filter out only the desired elements of the respective databases and leave out other regions accordingly.

It could prove to be advantageous to implement this layer function directly via mechanisms of the distributed ledger technology that is used. In this case, appropriate mechanisms such as smart contracts and self-sovereign identities or decentralized identifiers could be used.

The exemplary embodiment is advantageously designed for the automotive industry for use with motor vehicles. The method can, however, be used for any development of multivariant and complex mass-produced products, such as in aircraft, lorries, buses, agricultural machinery, ships, trains, drones, robots, two-wheeled vehicles, autonomous vehicles, machines and systems in both the consumer goods and ICT industries.

Furthermore, the presented method enables a type-based product line development concept to be implemented in the context of distributed and homogeneous development ecosystems, in order to satisfy requirements set out, for example, according to the UNECE regulations UN-R 156.

A method as described herein can also be in the form of a computer program that implements the method on one of the electronic computing devices when it is executed thereon. Likewise, an electronically readable data carrier with electronically readable control information stored thereon can also exist, which comprises at least one described computer program and is designed in such a way a described method can be carried out when the data carrier is used in an electronic computing device.

The invention claimed is:

1. A method for documenting a type configuration generated using a provided type library, the method comprising:
providing, by a first computing device, a first version of the type library;
storing an identification value of the first version of the type library in a distributed database;
generating, by the first computing device or at least one further computing device, a first at least partial type configuration or a first complete type configuration using the first version of the type library; and
storing an identification value of the first type configuration in the distributed database,
wherein the type library, the first at least partial type configuration, or the complete type configuration is stored in at least one further database,
wherein at least one of the databases, the first computing device computing device, or the at least one further computing device is synchronised via the distributed database, and
wherein at least one of the first and at least one further computing devices is part of a product line development.

2. The method of claim 1, wherein the distributed database is operated with a consensus method for changes to the distributed database.

3. The method of claim 1, further comprising:
providing, by the first computing device or the at least one further computing device, a second version of the type library, wherein the second version is derived from the first version; and
storing an identification value of the second version of the type library in the distributed database.

4. The method of claim 3, further comprising:
generating, by the first computing device or the at least one further computing device, at least one second at least partial type configuration using the second version of the type library; and
storing an identification value of the second type configuration in the distributed database.

5. The method of claim 1, wherein the identification value of the first version of the type library comprises a reference value, a cryptographic hash value, the first version of the type library, the first at least partial type configuration, or the first complete type configuration.

6. The method of claim 1, wherein at least one of the first computing device and the at least one further computing devices provides a runtime environment to execute the first version of the type library, the first at least partial type configuration, or the first complete type configuration.

7. A non-transitory computer-readable medium storing program instructions for documenting a type configuration generated using a provided type library, which when executed by a computing device cause the computing device to:
providing a first version of the type library;
storing an identification value of the first version of the type library in a distributed database;
generating a first at least partial type configuration or a first complete type configuration using the first version of the type library; and
storing an identification value of the first type configuration in the distributed database,
wherein the type library, the first at least partial type configuration, or the complete type configuration is stored in at least one further database,
wherein at least one of the databases or the computing device is synchronised via the distributed database, and
wherein the computing device is part of a product line development.

* * * * *